(12) United States Patent
Ueda et al.

(10) Patent No.: US 8,715,135 B2
(45) Date of Patent: May 6, 2014

(54) CONTROL DEVICE FOR HYBRID VEHICLE AUTOMATIC TRANSMISSION

(71) Applicants: Yosuke Ueda, Ichimiya (JP); Masahiro Asai, Anjo (JP); Kazuhiko Motodohi, Anjo (JP); Yoichi Tajima, Anjo (JP)

(72) Inventors: Yosuke Ueda, Ichimiya (JP); Masahiro Asai, Anjo (JP); Kazuhiko Motodohi, Anjo (JP); Yoichi Tajima, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 13/846,315

(22) Filed: Mar. 18, 2013

(65) Prior Publication Data

US 2013/0260957 A1    Oct. 3, 2013

(30) Foreign Application Priority Data

Mar. 30, 2012    (JP) ................. 2012-082950

(51) Int. Cl.
*B60K 1/02* (2006.01)
*F16H 61/26* (2006.01)

(52) U.S. Cl.
USPC ............................................. 477/3; 477/158

(58) Field of Classification Search
USPC ............................................. 477/3, 156, 158
See application file for complete search history.

(56) References Cited

U.S. PATENT DOCUMENTS

2001/0005704 A1*   6/2001   Kitano et al. ................. 477/107
2005/0103544 A1    5/2005   Takami et al.
2010/0250075 A1    9/2010   Suzuki et al.
2010/0292046 A1*  11/2010   Kaltenbach ..................... 477/3
2012/0059542 A1*   3/2012   Kawai et al. ................... 701/22

FOREIGN PATENT DOCUMENTS

| JP | A-11-93721 | 4/1999 |
|---|---|---|
| JP | A-2001-041317 | 2/2001 |
| JP | A-2004-215402 | 7/2004 |
| JP | A-2004-347066 | 12/2004 |
| JP | A-2005-083492 | 3/2005 |
| JP | A-2005-096574 | 4/2005 |
| JP | A-2006-347431 | 12/2006 |
| JP | A-2007-153110 | 6/2007 |
| JP | A-2010-223399 | 10/2010 |

OTHER PUBLICATIONS

International Search Report issued in International Application No. PCT/JP2013/055802 dated May 14, 2013 (with translation).

* cited by examiner

*Primary Examiner* — Edwin A Young
(74) *Attorney, Agent, or Firm* — Oliff PLC

(57) ABSTRACT

A control device for a hybrid vehicle automatic transmission. A friction engagement element control unit includes a first play elimination control unit that sets a first pressure as the pressure for a first set time where the predetermined friction engagement element is engaged using a hydraulic pressure from the electric oil pump in a travel state in which only the rotary electric machine serves as a drive source. The first play elimination pressure is lower than a play elimination pressure for use in the case where the predetermined friction engagement element is engaged using a hydraulic pressure from the mechanical oil pump in a travel state in which the internal combustion engine serves as a drive source.

6 Claims, 7 Drawing Sheets

F I G . 1
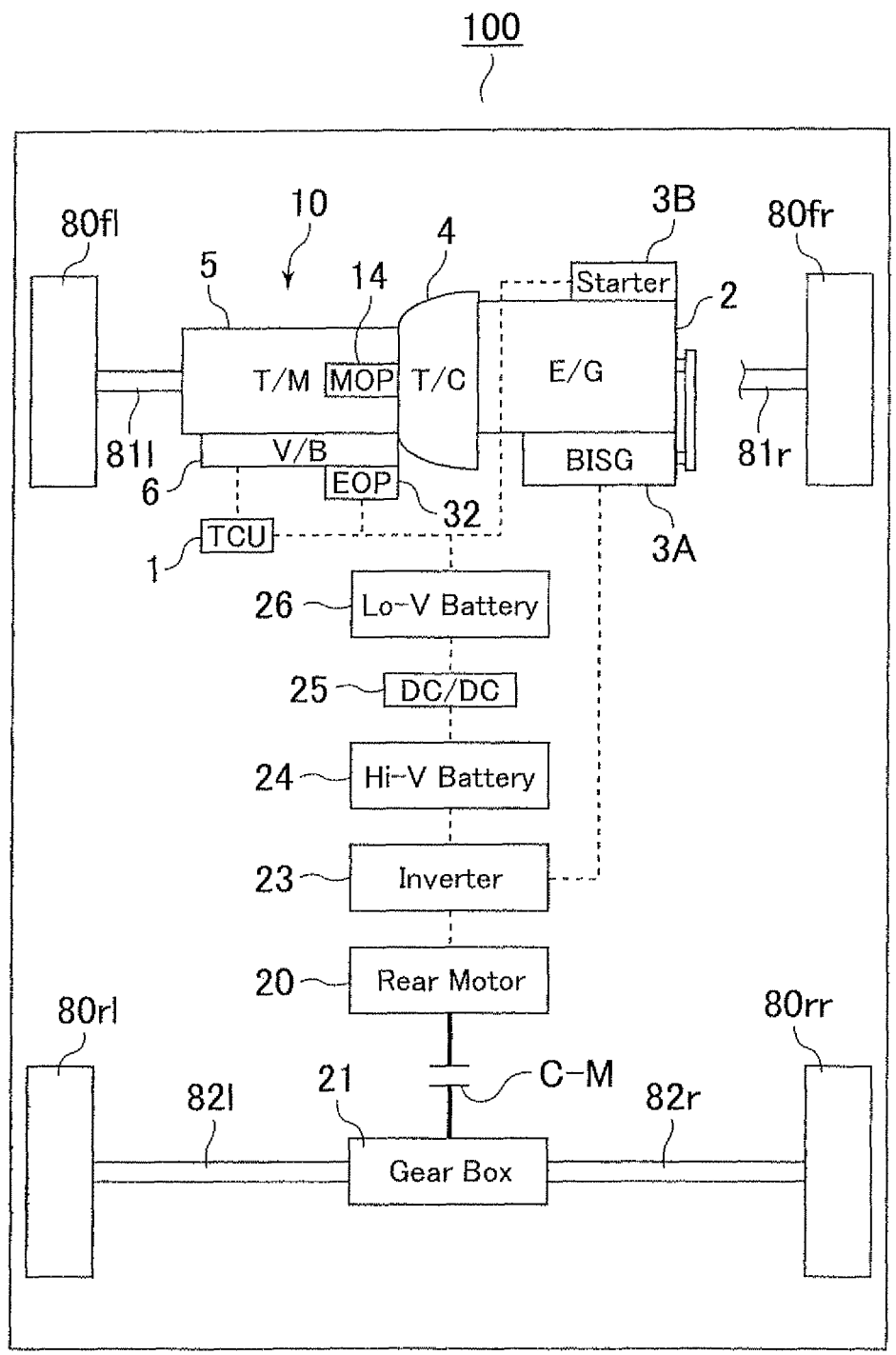

FIG. 3

|   | C-1 | C-2 | C-3 | B-1 | B-2 | F-1 |
|---|---|---|---|---|---|---|
| P |  |  |  |  |  |  |
| REV |  |  | ○ |  | ○ |  |
| N |  |  |  |  |  |  |
| 1ST | ○ |  |  |  | (○) | ○ |
| 2ND | ○ |  |  | ○ |  |  |
| 3RD | ○ |  | ○ |  |  |  |
| 4TH | ○ | ○ |  |  |  |  |
| 5TH |  | ○ | ○ |  |  |  |
| 6TH |  | ○ |  | ○ |  |  |

※ (○): ENGINE BRAKE IN OPERATION

CONTROL DEVICE FOR HYBRID VEHICLE AUTOMATIC TRANSMISSION

INCORPORATION BY REFERENCE

The disclosure of Japanese Patent Application No. 2012-082950 filed on Mar. 30, 2012 including the specification, drawings and abstract is incorporated herein by reference in its entirety.

BACKGROUND OF THE INVENTION

The present invention pertains to a hybrid vehicle that includes a rotary electric machine (hereinafter simply referred to as "motor") and an internal combustion engine each serving as a drive source and that allows power of the internal combustion engine to be transferred to drive wheels via an automatic transmission, and in particular relates to a control device for the automatic transmission.

DESCRIPTION OF THE RELATED ART

A variety of hybrid vehicle drive devices have recently been proposed to improve the fuel efficiency of a vehicle. In an example of such hybrid vehicle drive devices, an internal combustion engine is coupled to front wheels, a motor is coupled to rear wheels, and rotation of the internal combustion engine is transferred to the front wheels via an automatic transmission during hybrid travel and engine travel (Japanese Patent Application Publication No. 2010-223399 (JP 2010-223399 A)). The hybrid vehicle drive device is provided with an electric pump because a mechanical pump is stopped when the internal combustion engine is stopped. When the internal combustion engine is stopped, a hydraulic pressure based on the electric pump is supplied to a first friction engagement element (clutch C-1), which is engaged to establish a first speed in the automatic transmission, to prevent a delay in starting. In addition, a one-way clutch is used as an engagement element that is engaged together with the first friction engagement element to establish the first speed, to avoid drag due to oil when the vehicle is stationary.

SUMMARY OF THE INVENTION

In the device according to JP 2010-223399 A, when the internal combustion engine is stopped, the electric oil pump is driven to supply in advance a hydraulic pressure necessary for engagement to the friction engagement element for establishment of the first speed, in preparation for starting the internal combustion engine. This allows the internal combustion engine to be started and the friction engagement element to be engaged immediately in response to a driver depressing an accelerator pedal, and allows responsive travel that provides no sense of delay after the internal combustion engine is started. However, although JP 2010-223399 A discloses maintaining the friction engagement element for establishment of the first speed in the engaged state when the internal combustion engine is stopped, JP 2010-223399 A does not disclose engaging the friction engagement element on the basis of a hydraulic pressure from the electric oil pump with the internal combustion engine stopped. For example, in common automatic transmission, a hydraulic pressure for a friction engagement element is supplied via a manual shift valve. Therefore, in the case where the shift range is switched to a non-travel range (N range or P range), supply of a hydraulic pressure to the friction engagement element is blocked to disengage the friction engagement element. Thus, when the shift range is switched to a travel range (such as D range) in the case where the internal combustion engine is stopped and the shift range is a non-travel range, it is necessary to engage the friction engagement element on the basis of a hydraulic pressure from the electric oil pump with the internal combustion engine stopped as described above.

In general, the electric oil pump which supplies a hydraulic pressure necessary for engagement of the friction engagement element has a discharge capacity smaller than that of the mechanical oil pump because of the cost and the mountability. Therefore, if a hydraulic pressure to be supplied from the electric oil pump to the friction engagement element is controlled in the same manner as a hydraulic pressure supplied from the mechanical oil pump to engage the friction engagement element, a piston is not moved over a sufficient stroke for elimination of play of the friction engagement element. This may cause an abrupt raise in hydraulic pressure with the piston not moved over a sufficient stroke to cause an engagement shock due to abrupt engagement of the friction engagement element during movement of the piston.

It is therefore an object of the present invention to provide a control device for a hybrid vehicle automatic transmission that addresses the foregoing issues, by performing play elimination control such that movement of a piston for play elimination of a friction engagement element is reliably finished.

With reference to FIGS. 1, 4, 5A and 5B, for example, according to a first aspect of the present invention, a control device for a hybrid vehicle automatic transmission is mounted on a hybrid vehicle that includes a rotary electric machine and an internal combustion engine each serving as a drive source and that allows power of the internal combustion engine to be transferred to wheels via an automatic transmission and allows wheels to be driven by the rotary electric machine with the internal combustion engine stopped. The automatic transmission includes an electric oil pump and a mechanical oil pump driven by power of the internal combustion engine each serving as a hydraulic pressure source. In the automatic transmission, a hydraulic pressure from the hydraulic pressure source is regulated by a pressure regulation valve to be supplied to a hydraulic servo for a predetermined friction engagement element of the automatic transmission. The control device for a hybrid vehicle automatic transmission includes:

a friction engagement element control unit that controls the pressure regulation valve in engaging the predetermined friction engagement element so as to perform play elimination of the predetermined friction engagement element at a play elimination pressure, at which a piston for the predetermined friction engagement element is moved from an attachment position to a state immediately before the predetermined friction engagement element provides a torque capacity, and thereafter gradually increase the hydraulic pressure from the play elimination pressure. In the control device for a hybrid vehicle automatic transmission, the friction engagement element control unit (with reference to FIGS. 5A and 5B, for example) includes a first play elimination control unit that sets a first play elimination pressure as the play elimination pressure for a first set time in the case where the predetermined friction engagement element is engaged using a hydraulic pressure from the electric oil pump in a travel state in which only the rotary electric machine serves as a drive source, the first play elimination pressure is lower than a play elimination pressure for use in the case where the predetermined friction engagement element is engaged using a hydraulic pressure from the mechanical oil pump in a travel state in which the internal combustion engine serves as a drive source, and the first set time is longer than a set time for which the play elimination pressure is set in the case where the predetermined friction engagement element is engaged using a hydraulic pressure from the mechanical oil pump in a travel state in which the internal combustion engine serves as a drive source.

A command pressure (hydraulic pressure command value) is transmitted from the friction engagement element control unit to the pressure regulation valve, and thus the play elimination pressure is a command pressure.

With reference to FIGS. 4, 6, and 7, for example, according to a second aspect of the present invention, the control device includes a second play elimination control unit that sets a second play elimination pressure higher than the first play elimination pressure for a second set time. The second play elimination control unit is configured to operate in place of the first play elimination control unit in the case where the internal combustion engine is started to serve as a drive source during operation of the first play elimination control unit.

According to a third aspect of the present invention, the first play elimination pressure and the second play elimination pressure are each a constant pressure set in advance, and the second play elimination control unit computes the second set time on the basis of a proportion of an elapsed time from start of control by the first play elimination control unit to switching to control by the second play elimination control unit to the first set time.

According to a fourth aspect of the present invention, the predetermined friction engagement element is a first friction engagement element that is engaged for the automatic transmission to establish a first forward speed.

According to a fifth aspect of the present invention, control by the second play elimination control unit is started when a rotational speed of the internal combustion engine becomes equal to or more than a predetermined rotational speed (for example, 500 rpm).

With reference to FIG. 1, for example, according to a sixth aspect of the present invention, power of the internal combustion engine is transferred to either front wheels or rear wheels via the automatic transmission, and power of the rotary electric machine is transferred to the other wheels.

According to the first aspect of the invention, play elimination of the predetermined friction engagement element is finished by control by the first play elimination control unit which uses the first play elimination pressure based on a predetermined low pressure of the electric oil pump and the first set time when the automatic transmission is subjected to speed change control in preparation for travel by the internal combustion engine even in the case where the rotary electric machine serves as a drive source. Thus, engagement of the predetermined friction engagement element can be started after play elimination is finished to prepare for travel by the internal combustion engine while occurrence of an engagement shock is suppressed even if the electric oil pump having a small size and a predetermined capacity at a low pressure is used.

According to the second aspect of the invention, the second play elimination control unit based on the mechanical oil pump is caused to operate in place of the first play elimination control unit based on the electric oil pump in the case where the internal combustion engine is started to start driving the vehicle during operation of the first play elimination control unit. The second play elimination control unit can finish play elimination in a time shorter than the first set time to start drive by the internal combustion engine with a reduction in sense of discomfort such as sense of delay. Moreover, engagement of the predetermined friction engagement element can be started after play elimination at the second play elimination pressure is finished to suppress occurrence of an engagement shock.

According to the third aspect of the invention, the second play elimination control unit can easily and accurately compute the second set time for control by the second play elimination control unit in accordance with the elapsed time of control by the first play elimination control unit which has already been in progress, with the internal combustion engine started. The second play elimination control unit can thus perform play elimination with high accuracy and reliability to suppress an engagement shock at the start of engine travel.

According to the fourth aspect of the invention, the predetermined friction engagement element to be subjected to play elimination control is the first predetermined friction engagement element that is engaged for the automatic transmission to establish the first forward speed. Thus, the vehicle can be driven to travel by the internal combustion engine with the first speed established in the automatic transmission with the vehicle driven to travel by the rotary electric machine.

According to the fifth aspect of the invention, control by the second play elimination control unit is started when the rotational speed of the internal combustion engine exceeds a predetermined rotational speed (for example, 500 rpm). Thus, the second set pressure which is a relatively low hydraulic pressure can be generated immediately after the engine is started to allow switching of engine travel that provides substantially no sense of delay and that causes substantially no engagement shock.

According to the sixth aspect of the invention, the control device is applied to a hybrid vehicle in which power of the internal combustion engine is transmitted to either the front wheels or the rear wheels via the automatic transmission and in which power of the rotary electric machine is transmitted to the other wheels, thereby making it possible to adopt an electric oil pump having a small size and a small capacity to reduce a power loss and improve the fuel economy performance. Nonetheless, during travel by the rotary electric machine, shifting can be performed in the automatic transmission with an engagement shock suppressed by control by the first play elimination control unit performed at the first play elimination pressure for a relatively long period in preparation for engine travel. In addition, in switching to engine travel, travel by the engine can be performed with substantially no sense of delay provided and with an engagement shock suppressed by control by the second play elimination control unit which is performed relatively quickly.

BRIEF DESCRIPTION OF THE DRAWINGS

FIG. 1 is a schematic diagram showing a hybrid vehicle drive device to which the present invention may be applied;

FIG. 3 is an engagement table of the automatic transmission;

DETAILED DESCRIPTION OF THE EMBODIMENTS

Figure 2:
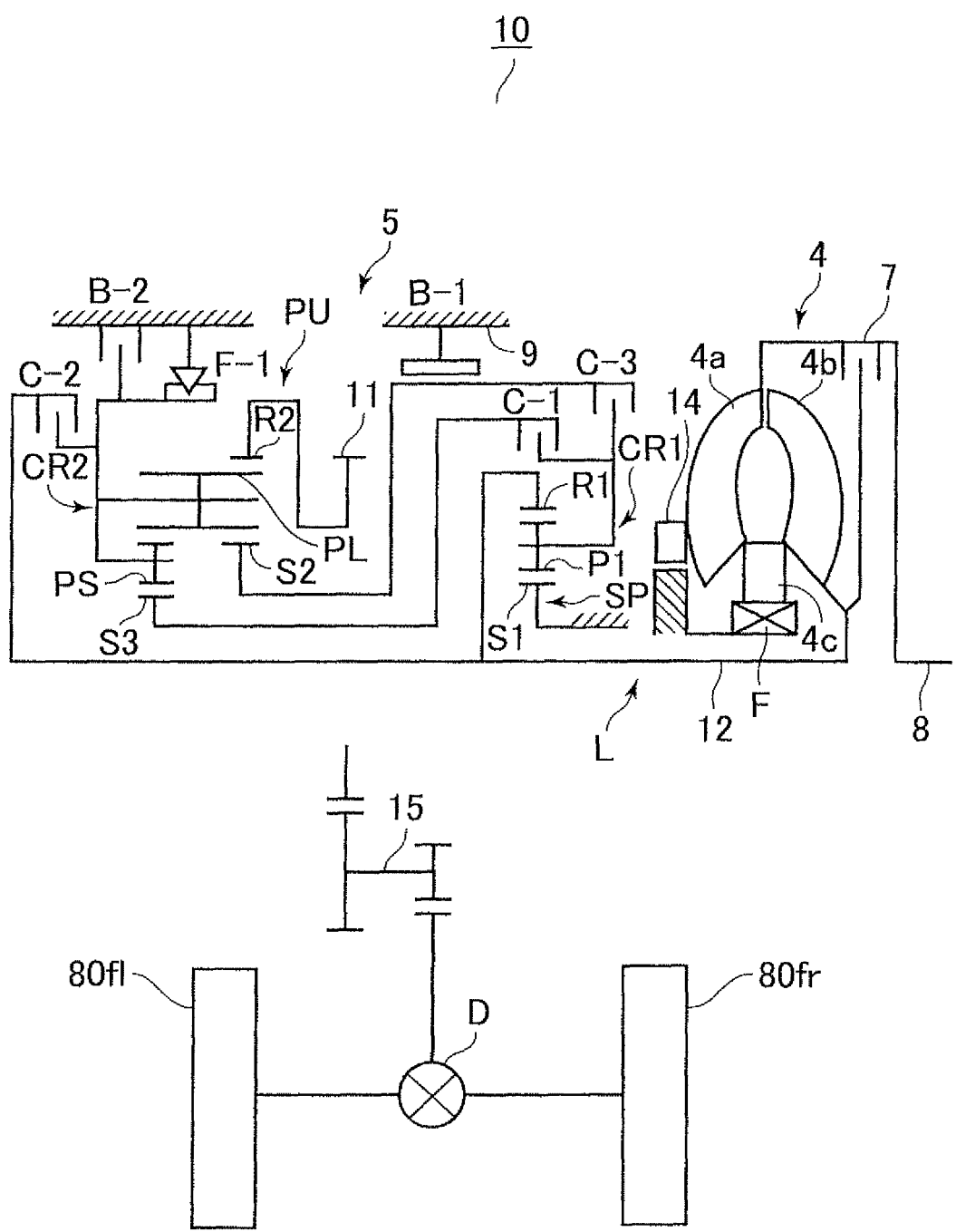
FIG. 2 is a schematic cross-sectional view showing an automatic transmission.

An embodiment of the present invention will be described below with reference to FIGS. 1 to 7. First, a hybrid vehicle drive device to which the present invention may be applied will be described with reference to FIG. 1.

As shown in FIG. 1, a hybrid vehicle (drive device) 100 according to the embodiment is for a rear-motor hybrid vehicle, which is formed like a so-called FF (front-engine front-drive) vehicle including an internal combustion engine (E/G) 2 mounted in the front side of the vehicle and an automatic transmission 10 mounted on a transfer path between the internal combustion engine 2 and left and right front wheels 80*fl*, 80*fr*, and which also includes a rear motor (rotary electric machine) 20 drivably coupled to left and right rear wheels 80*rl*, 80*rr*. That is, the hybrid vehicle drive device 100 is configured to enable front-wheel drive during engine travel, rear-wheel drive during EV travel, and four-wheel drive during hybrid travel.

More particularly, a belt integrated starter generator (BISG) 3A is connected to the internal combustion engine 2 to be able to start the internal combustion engine 2. The belt integrated starter generator (BISG) 3A is supplied with electric power from a high-voltage battery (Hi-V Battery) 24 via an inverter 23 to be able to start the internal combustion engine 2 with high output and charge the high-voltage battery 24 during operation (drive) of the internal combustion engine 2.

A starter 3B is a starter driven by a common low-voltage battery (Lo-V Battery) 26 (a so-called 12-V power source). In the hybrid vehicle drive device 100, the belt integrated starter generator (BISG) 3A is used to raise the rotational speed of the internal combustion engine 2 to a rotational speed higher than an idle rotational speed and thereafter ignite the internal combustion engine 2 at normal temperature (equal to or more than 0 degrees, for example), and the starter 3B is used to normally start the internal combustion engine 2 at low temperature (less than 0 degrees, for example).

The automatic transmission 10 to be discussed in detail later is connected to the internal combustion engine 2. The automatic transmission 10 roughly includes a torque converter (T/C) 4, an automatic speed change mechanism (TIM) 5, a hydraulic control device (V/B) 6, and so forth. The torque converter 4 is drivably coupled to the internal combustion engine 2. The automatic speed change mechanism (TIM) 5 is drivably coupled to the torque converter 4. The automatic speed change mechanism (TIM) 5 is connected to left and right axles 81*l*, 81*r* via a differential device D (see FIG. 2) as discussed in detail later to be drivably coupled to the left and right front wheels 80*fl*, 80*fr*, A mechanical oil pump (MOP) 14 driven by rotation of the internal combustion engine 2 is disposed in a portion of the automatic transmission 10 interposed between the automatic speed change mechanism 5 and the torque converter 4.

The automatic speed change mechanism 5 is provided with the hydraulic control device (V/B) 6 which controls hydraulic pressures for friction engagement elements (clutches and brakes) for shifting to be discussed later. Solenoid valves (pressure regulation valves), etc. built in the hydraulic control device 6 are electronically controlled on the basis of an electronic command from a control section (Transmission Control Unit: TCU) (a control device for a hybrid vehicle automatic transmission) 1. The hydraulic control device 6 is provided with an electric oil pump 32 driven independently of the internal combustion engine 2 (that is, that may be driven while the mechanical oil pump is stopped) as discussed in detail later so that a hydraulic pressure can be supplied from the electric oil pump 32 to the hydraulic control device 6. That is, engagement pressures to be supplied to hydraulic servos for the friction engagement elements for shifting are freely regulated by the hydraulic control device 6 on the basis of a hydraulic pressure generated by the electric oil pump 32 and the mechanical oil pump 14.

The electric oil pump 32 and the control section (control device) 1 are driven using electric power of the low-voltage battery 26. The low-voltage battery 26 is connected to the high-voltage battery 24 via a DC/DC converter (step-down circuit) 25 to be supplied with electric power from the high-voltage battery 24.

The rear motor 20 is connected to the high-voltage battery 24 via the inverter 23 to be able to perform power running and regeneration. The rear motor 20 is drivably coupled to a gear box 21 via a motor disengagement clutch C-M. A speed reduction gear mechanism with a predetermined speed reduction ratio and a differential device (not shown) are built in the gear box 21. When the motor disengagement clutch C-M is engaged, rotation of the rear motor 20 is transferred to the left and right rear wheels 80*rl*, 80*rr* with the speed reduction gear mechanism of the gear box 21 reducing the speed of the rotation and the differential device absorbing the difference in rotation between left and right axles 82*l*, 82*r*.

Subsequently, the configuration of the automatic transmission 10 will be described with reference to FIG. 2. The automatic transmission 10 is disposed on a transfer path between the internal combustion engine 2 (see FIG. 1) and the left and right front wheels 80*fl*, 80*fr*. The automatic transmission 10 includes an input shaft 8 that can be connected to a crankshaft of the internal combustion engine 2, and the torque converter 4 and the automatic speed change mechanism 5 discussed above centered around the axial direction of the input shaft 8.

The torque converter 4 includes a pump impeller 4*a* connected to the input shaft 8 of the automatic transmission 10, a turbine runner 4*b* to which rotation of the pump impeller 4*a* is transferred via a hydraulic fluid, and a stator 4*c* that increases torque while straightening the flow of oil returning from the turbine runner 4*b* to the pump impeller 4*a*. The turbine runner 4*b* is connected to an input shaft 12 (input member) of the automatic speed change mechanism 5 disposed coaxially with the input shaft 8. The torque converter 4 further includes a lock-up clutch 7. When the lock-up clutch 7 is engaged, rotation of the input shaft 8 of the automatic transmission 10 is directly transferred to the input shaft 12 of the automatic speed change mechanism 5.

When rotation of the turbine runner 4*b* falls below rotation of the pump impeller 4*a*, the stator 4*c* is fixed not to be rotated by a one-way clutch F so that the stator 4*c* receives a reaction force of the flow of oil to increase torque. When rotation of the turbine runner 4*b* exceeds rotation of the pump impeller 4*a*, the stator 4*a* runs idle so that the flow of oil is not directed in the negative direction.

A portion of the pump impeller 4*a* on the automatic speed change mechanism 5 side is drivably coupled to the mechanical oil pump 14 which is disposed in a partition wall fixed to a transmission case 9. That is, the mechanical oil pump 14 is drivably coupled to operate in conjunction with the internal combustion engine 2 via the input shaft 8.

The automatic speed change mechanism 5 includes a planetary gear SP and a planetary gear unit PU provided on the input shaft 12. The planetary gear SP is a so-called singlepinion planetary gear, which includes a sun gear S1, a carrier CR1, and a ring gear R1 and in which the carrier CR1 includes a pinion P1 meshed with the sun gear S1 and the ring gear R1.

The planetary gear unit PU is a so-called Ravigneaux type planetary gear, which includes four rotary elements, namely a sun gear S2, a sun gear S3, a carrier CR2, and a ring gear R2 and in which the carrier CR2 includes a long pinion PL meshed with the sun gear S2 and the ring gear R2 and a short pinion PS meshed with the sun gear S3 in such a manner that the long pinion PL and the short pinion PS are meshed with each other.

The sun gear S1 of the planetary gear SP is integrally fixed to the transmission case 9 so as not to be rotatable. The ring gear R1 makes the same rotation (hereinafter referred to as "input rotation") as rotation of the input shaft 12. Further, the carrier CR1 rotates at a speed reduced compared to the speed of the input rotation by the sun gear S1 which is fixed and the carrier CR1 which makes the input rotation. The carrier CR1 is connected to a clutch (predetermined friction engagement element) C-1 and a clutch C-3.

The sun gear S2 of the planetary gear unit PU is connected to a brake B-1 formed as a band brake so as to be selectively fixed with respect to the transmission case 9. The sun gear S2 is also connected to the clutch C-3 so as to selectively receive reduced-speed rotation of the carrier CR1 via the clutch C-3. The sun gear S3 is connected to the clutch C-1 so as to selectively receive reduced-speed rotation of the carrier CR1.

Further, the carrier CR2 is connected to a clutch C-2, to which rotation of the input shaft 12 is input, so as to selectively receive the input rotation via the clutch C-2. The carrier CR2 is also connected to a one-way clutch F-1 and a brake B-2 so as to be restricted from rotating in one direction with respect to the transmission case 9 via the one-way clutch F-1 and so as to be selectively fixed (unrotatable) via the brake B-2. The ring gear R2 is connected to a counter gear (output member) 11. The counter gear 11 is connected to the wheels 80$fl$, 80$fr$ via a counter shaft 15 and the differential device D.

In the hybrid vehicle drive device 100 configured as described above, during engine travel in which the drive force of the internal combustion engine 2 is used, the motor disengagement clutch C-M shown in FIG. 1 is disengaged to disengage the rear motor 20 from the wheels 80$rl$, 80$rr$. Then, in the automatic transmission 10, the control section 1 determines an optimum shift speed in accordance with the vehicle speed and the accelerator operation amount to electronically control the hydraulic control device 6. The speed of the drive force of the internal combustion engine 2 is changed by one of first to sixth forward speeds and a reverse speed established on the basis of the determined shift speed so that the drive force of the internal combustion engine 2 is transferred to the wheels 80$fl$, 80$fr$. The first to sixth forward speeds and the reverse speed of the automatic transmission 10 are established with the clutches C-1 to C-3, the brakes B-1 to B-2, and the one-way clutch F-1 operated (subjected to engagement control) in accordance with the operation table shown in FIG. 3 to change the rotation transfer state of the automatic speed change mechanism 5.

When a transition is made from the engine travel mode to hybrid travel, the motor disengagement clutch C-M shown in FIG. 1 is engaged to drivably couple the rear motor 20 to the wheels 80$rl$, 80$rr$. This allows the drive force of the rear motor 20 to be appropriately used assistively or for regeneration on the basis of the accelerator operation amount (request for a drive force from a driver) in addition to the drive force of the internal combustion engine 2. That is, the hybrid vehicle is driven using the drive force of the internal combustion engine 2 and the drive force of the rear motor 20.

During acceleration in the engine travel mode by the drive force of the internal combustion engine 2, the motor disengagement clutch C-M may be disengaged to disengage the rear motor 20 from the wheels 80$rl$, 80$rr$ so as not to cause a travel resistance. During deceleration during engine travel, meanwhile, the motor disengagement clutch C-M is preferably engaged so that the rear motor 20 applies regenerative braking, thereby the fuel efficiency is improved.

During EV travel, the motor disengagement clutch C-M shown in FIG. 1 is engaged to drivably couple the rear motor 20 to the wheels 80$rl$, 80$rr$. The internal combustion engine 2 is stopped, and the clutches C-2 to C-3 and the brakes B-1 to B-2 in the automatic transmission 10 are controlled so as to be disengaged so that the automatic transmission 10 is brought into a neutral state in which the automatic transmission 10 can run idle. This allows the drive force of the rear motor 20 to be appropriately used for power running or regeneration on the basis of the accelerator operation amount (request for a drive force from the driver). That is, the hybrid vehicle is driven using only the drive force of the rear motor 20.

During EV travel, members drivably coupled to the wheels 80$fl$, 80$fr$ of the automatic speed change mechanism 5 (such as the differential device D, the counter shaft 15, the counter gear 11, and each gear of the planetary gear unit PU) are rotated in an accompanying manner, and the mechanical oil pump 14 is stopped as the internal combustion engine 2 is stopped. Thus, during EV travel, the electric oil pump 32 supplies lubricating oil to portions to be lubricated of the automatic speed change mechanism 5.

Normally, the hybrid vehicle (drive device) 100 performs travel (EV travel) by driving the rear wheels 80$rl$, 80$rr$ using the rear motor 20. In this event, in order that travel by the internal combustion engine 2 can be started immediately, a predetermined friction engagement element of the automatic speed change mechanism 5, e.g. the clutch C-1 which serves as a first friction engagement element, is engaged and the other engagement element for establishment of a shift speed such as the one-way clutch F-1 or the brake B-1 is disengaged on condition that the vehicle speed is equal to or less than a predetermined vehicle speed (for example, equal to or less than 40 km). That is, the one-way clutch F-1 is automatically caused to run idle with the front wheels 80$fl$, 80$fr$ rotated by the travel by the rear motor 20, the automatic transmission 10 is caused to run idle with no shift speed established, and the internal combustion engine 2 is stopped. In the case where the vehicle speed is more than the predetermined vehicle speed, meanwhile, all the friction engagement elements including the predetermined friction engagement element are disengaged.

When the remaining battery capacity (SOC) falls short in the EV travel mode and switching is made to the engine travel mode or the hybrid travel mode, the internal combustion engine 2 is started by the starter generator 3A or the starter 3B, and the other engagement element of the automatic speed change mechanism 5 is actuated to cause the automatic transmission 10 to establish a predetermined shift speed in combination with the predetermined friction engagement element which has already been engaged in the EV travel mode. This allows the drive force of the internal combustion engine 2 to be immediately transferred to the front wheels 80$fl$, 80$fr$ with the predetermined shift speed of the automatic transmission 10. For example, in the case where the vehicle has just started and is at a low speed, the rear motor 20 is stopped or decelerated, and the disengagement clutch C-M is disengaged to disable transfer of the drive force of the rear motor 20 to the rear wheels 80$rl$, 80$rr$. This allows the one-way clutch F-1, which has been running idle, to be engaged in addition to the clutch C-1, which has already been engaged, to cause the automatic speed change mechanism 5 to establish the first speed.

Figure 4:
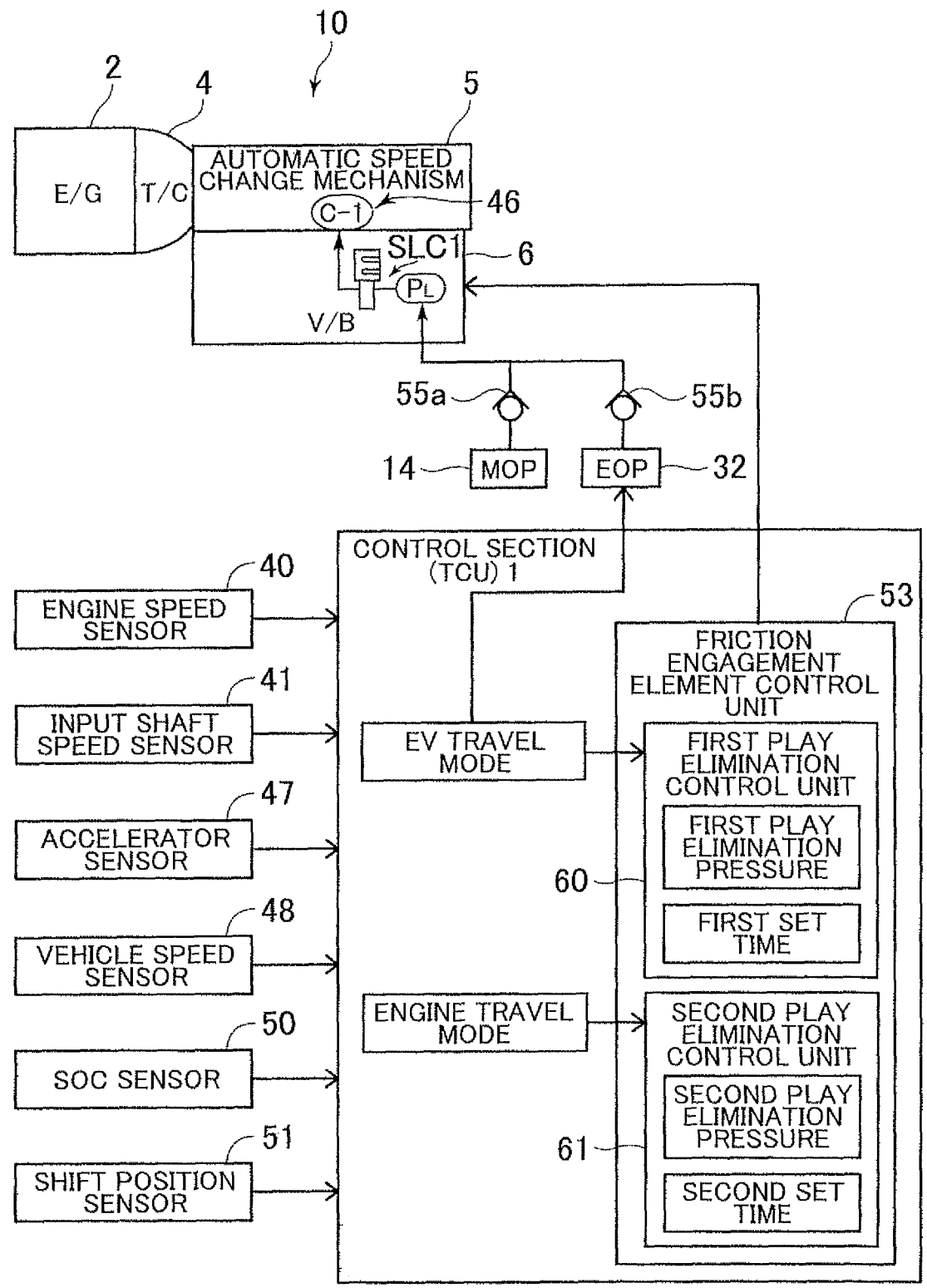
FIG. 4 is a block diagram showing a control section of the automatic transmission in the hybrid vehicle drive device.

Then, control for the automatic transmission 10 in the EV travel mode and in a situation where the internal combustion engine is started in the EV travel mode will be described. As shown in FIG. 4, the control section (control device) (TCU) 1 for the automatic transmission 10 receives as inputs signals from an engine speed sensor 40, an input shaft speed sensor 41, an accelerator sensor 47, a vehicle speed sensor 48, a remaining battery capacity (SOC) sensor 50, and a shift position sensor 51 that detects the position of a shift lever, etc. The remaining battery capacity (SOC) sensor 47 etc. determines whether the vehicle is in the EV travel mode or the engine travel mode, the shift speed is determined using a speed map or the like in each of the modes, and a friction engagement element control unit 53 outputs a hydraulic pressure command value and a predetermined switching signal to a valve body 6. The engine travel mode is a mode in which the vehicle travels using the internal combustion engine as a drive source, and includes the hybrid travel mode. In addition, in engaging the clutch, the friction engagement element control unit 53 controls a solenoid valve etc. with the hydraulic pressure command value so as to control a command value for the clutch (for example, C-1 pressure) such that elimination of play of the clutch is performed at a play elimination pressure at which a piston for the clutch is moved from the attachment position to a state immediately before the clutch provides a torque capacity and the hydraulic pressure is gradually increased (swept up) from the play elimination pressure.

The friction engagement element control unit 53 includes a first play elimination control unit 60 that operates even in the EV travel mode in preparation for switching to the engine travel mode and that uses a first play elimination pressure which is a predetermined constant low pressure based on the electric oil pump 32, in particular, and a first set time set in advance. The friction engagement element control unit 53 also includes a second play elimination control unit 61 that functions in place of the first play elimination control unit 60 when the engine is started during travel by the motor 20, in particular. The second play elimination control unit 61 uses a second play elimination pressure which is a predetermined constant low pressure based on the mechanical oil pump 14, and a second set time computed on the basis of the proportion of the elapsed time of the first play elimination control unit which has elapsed before switching to the second play elimination control unit to the first set time.

The valve body 6 switches between hydraulic paths in accordance with the hydraulic pressure command value and the predetermined switching signal from the friction engagement element control unit 53 to regulate a line pressure etc. to a predetermined regulator pressure and to regulate hydraulic pressures for hydraulic servos for the lock-up clutch 7 and the friction engagement elements C-1 to C-3 and B-1 and B-2 of the automatic speed change mechanism 5 in accordance with the travel state. When the clutch C-1 is taken as a typical one of the friction engagement elements, a linear solenoid valve (pressure regulation valve) SLC1 controlled in accordance with a hydraulic pressure command value from the friction engagement element control unit 53 regulates the line pressure $P_L$ (or a modulator pressure obtained by regulating the line pressure) to a hydraulic pressure corresponding to the travel state or a predetermined play elimination pressure set in advance in preparation for engagement of the predetermined friction engagement element to supply the resulting hydraulic pressure to a hydraulic servo 46 for the clutch C-1.

As discussed earlier, the automatic transmission 10 includes the mechanical oil pump 14 and the electric oil pump 32 each serving as a hydraulic pressure source. The mechanical oil pump 14 is driven by rotation of the internal combustion engine 2. The electric oil pump 32 is driven by the low-voltage battery, and has a small capacity and a small size. The electric oil pump 32 operates in accordance with a signal from the control section 1 in the EV travel mode, in particular. The oil pumps 14, 32 communicate with the supply side of a line pressure passage via check valves 55a, 55b, respectively. The check valves 55a, 55b block a reverse flow from the line pressure passage to the pumps 14, 32, respectively.

Figure 5A:
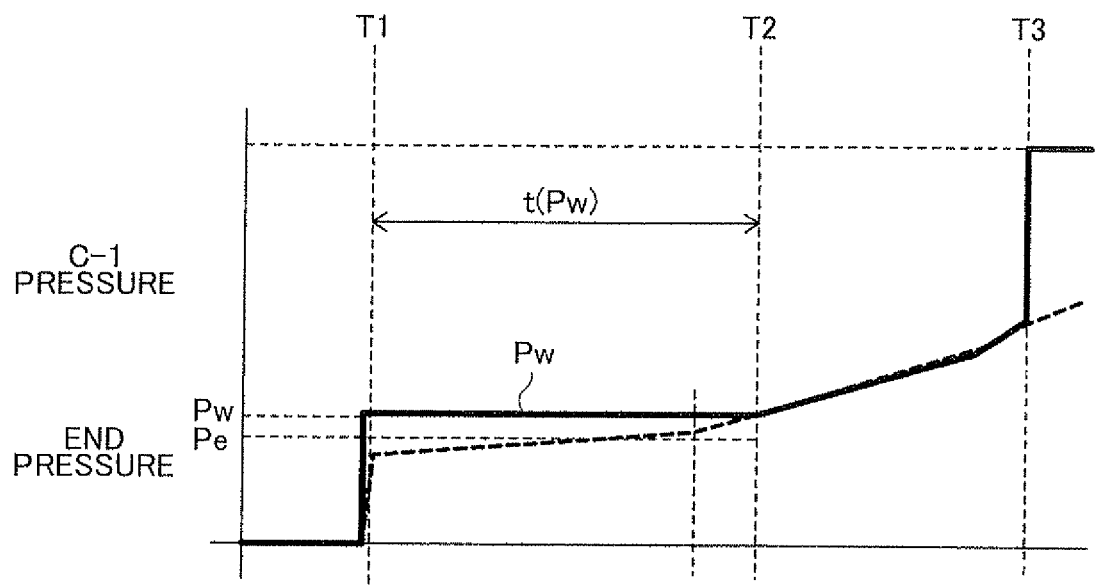
FIG. 5A is a time chart showing the state of engagement of a friction engagement element during start of the vehicle in EV travel.

Then, control for the automatic transmission during engagement of the predetermined friction engagement element in the EV travel mode and with the internal combustion engine started in the middle of engagement of the predetermined friction engagement element in the EV travel mode will be described with reference to FIGS. 5A to 7. In the EV travel mode, the internal combustion engine 2 is stopped, and therefore the electric oil pump 32 is driven constantly. In the case where the vehicle is in a travel state (a state in which the vehicle is traveling at a vehicle speed of more than 0 km/h) with the engine stopped, for example in the case where the vehicle is traveling by the inertia of the vehicle with the shift lever in the N (neutral) range and the EV travel mode suspended, and when the shift lever is shifted from the N (neutral) range to the D (drive) range (S-1), the rear motor 20 is brought into a drivable state (the clutch C-M is engaged) (S-2), and the processes in and after S-3 are executed (T1 in FIG. 5A). The electric oil pump 32 has a small capacity, and is configured to have a discharge capacity determined by a minimum compensation pressure Pw that is slightly higher than a pressure (end pressure) Pe at which a piston of a hydraulic servo for the predetermined friction engagement element, for example the clutch C-1, is moved as shown in FIG. 5A. At the discharge pressure of the electric oil pump 32, the play elimination pressure Pw (first play elimination pressure) at which the piston of the hydraulic servo 46 is moved from the attachment position into a play eliminated state immediately before the friction engagement element provides a torque capacity with a multiplicity of friction plates in contact with each other is commanded (set) for the first set time t(Pw) set in advance (S-3). The play elimination pressure Pw (first play elimination pressure) set here is set in advance as a constant pressure. However, the play elimination pressure Pw may not be a constant pressure, and may be a pressure that allows the piston of the hydraulic servo 46 to be moved from the attachment position into a play eliminated state immediately before the friction engagement element provides a torque capacity with a multiplicity of friction plates in contact with each other. For example, in the case where play elimination is performed in which a relatively high fast fill pressure is commanded for a predetermined time for the command value for the clutch (C-1 pressure) and thereafter a relatively low constant pressure is commanded to move the piston to a stroke end, the play elimination pressure may include the relatively high fast fill pressure for the predetermined time and the relatively low constant pressure. Then, a timer 1 starts counting down for the first set time t(Pw) set as described above (S-4).

First play elimination control is performed (S-5) until the timer 1 times out (S-7: NO) at a constant low pressure regulated by the linear solenoid valve (pressure regulation valve) SLC1 based on the minimum compensation pressure Pw generated by the electric oil pump 32. In the first play elimination control, only oil from the electric oil pump 32 is supplied to the hydraulic servo 46 continuously for the relatively long set time t(Pw) at the constant low pressure Pw to bring the hydraulic servo 46 into a play eliminated state immediately before a torque capacity is provided with the piston moved to the stroke end. In this event, the vehicle is in the EV travel state with the rear wheels 80*rl*, 80*rr* driven by the rear motor 20.

When the timer 1 times out (S-7: YES) (T2 in FIG. 5A), play elimination of the piston is completed. After that, the torque capacity of the clutch C-1 is slowly raised by a hydraulic pressure difference between the stroke end pressure Pe and the minimum compensation pressure Pw. Further after that, sweep-up control in which a hydraulic pressure is raised at a gentle gradient is executed (S-8). After the hydraulic pressure is swept up, engagement of the predetermined friction engagement element (C-1) is completed (S-9) (T3 in FIG. 5A). In FIG. 5A, the solid line indicates the hydraulic pressure command value from the control section 1 for the C-1 pressure, and the chain line indicates the actual pressure of the C-1 hydraulic servo.

Figure 5B:
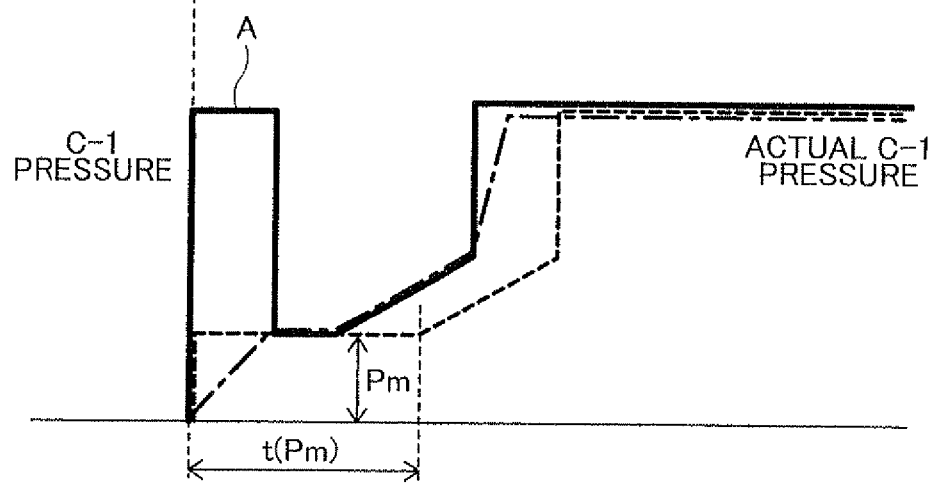
FIG. 5B is a similar time chart for engine travel.

FIG. 5B shows the hydraulic pressure of the clutch C-1 in the event that the shift lever is shifted from the N (neutral) range to the D (drive) range in a state (engine travel mode) in which the vehicle is traveling with the internal combustion engine 2 rotating so that the vehicle can be driven by the internal combustion engine 2 and in the case where the vehicle is traveling by the inertia of the vehicle with the shift lever in the N (neutral) range as in the EV travel. The command value for the clutch (C-1 pressure) is brought to a relatively high fast fill pressure A for a predetermined time to rapidly fill the hydraulic servo with oil, and then brought to a relatively low constant pressure Pm to perform play elimination in which the piston is moved to the stroke end. After that, the hydraulic pressure is swept up to engage the clutch C-1. In second play elimination control to be discussed later, the relatively low play elimination pressure Pm is tentatively set for a predetermined set time t(Pm) as indicated by the dotted line in FIG. 5B, and a second set time to be discussed later is computed with reference to the set time t(Pm) set for play elimination in which the piston is moved to the stroke end.

In the embodiment, the constant pressure (a pressure that does not cause variations in input shaft speed (not shown) under any circumstances) that is lower than the fast fill pressure A and is used next to the fast fill pressure A and the play elimination pressure Pm used in the second play elimination control to be discussed later are the same as each other. However, the constant pressure and the play elimination pressure Pm may be different from each other. For example, the play elimination pressure Pm used in the second play elimination control may be higher than the constant pressure that is lower than the fast fill pressure A and is used next to the fast fill pressure A, and vice versa.

In the engine travel mode (including hybrid travel) in which the internal combustion engine 2 is used as a drive source, the hydraulic pressure for the clutch C-1 is controlled using a relatively large amount of oil from the mechanical oil pump 14, and the play elimination control is completed in a relatively short time. In the engagement control through EV travel discussed above, in contrast, the electric oil pump 32 having a relatively small capacity requires a relatively long time to complete play elimination control in which the piston is moved to the stroke end, and thereafter the hydraulic pressure is swept up to start engagement of the clutch C-1. Thus, the clutch C-1 is not abruptly engaged to cause abrupt variations in rotation of the input shaft, which rarely causes an engagement shock. In the engagement control through EV travel, in addition, the vehicle travels using the drive force of the rear motor 20, and the automatic transmission 10 is running idle with only one of the engagement elements engaged in preparation for engine travel. Therefore, no sense of delay will be given even if it takes a significant time before complete engagement of the clutch C-1.

Figure 6:
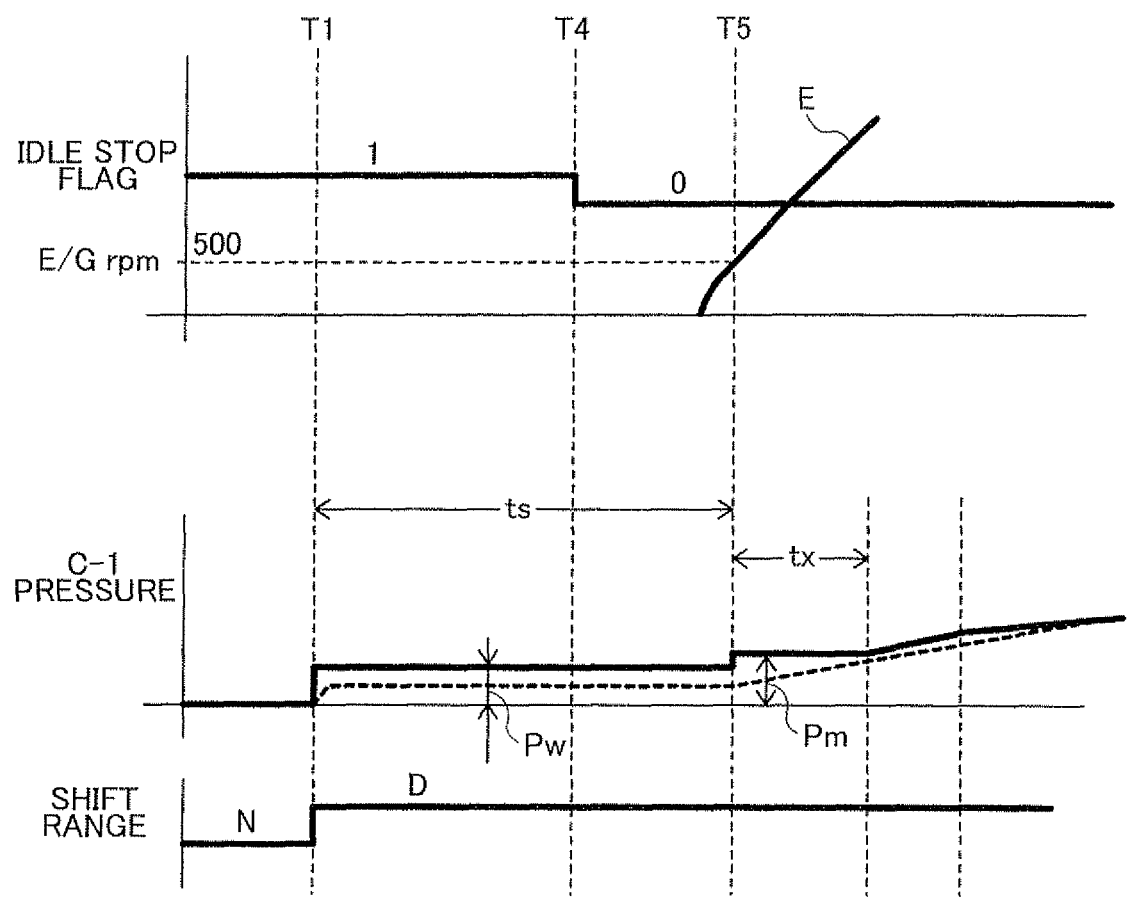
FIG. 6 is a time chart showing the state of engagement of the friction engagement element in a case where an internal combustion engine is started in the middle of starting the vehicle in EV travel.
Figure 7:
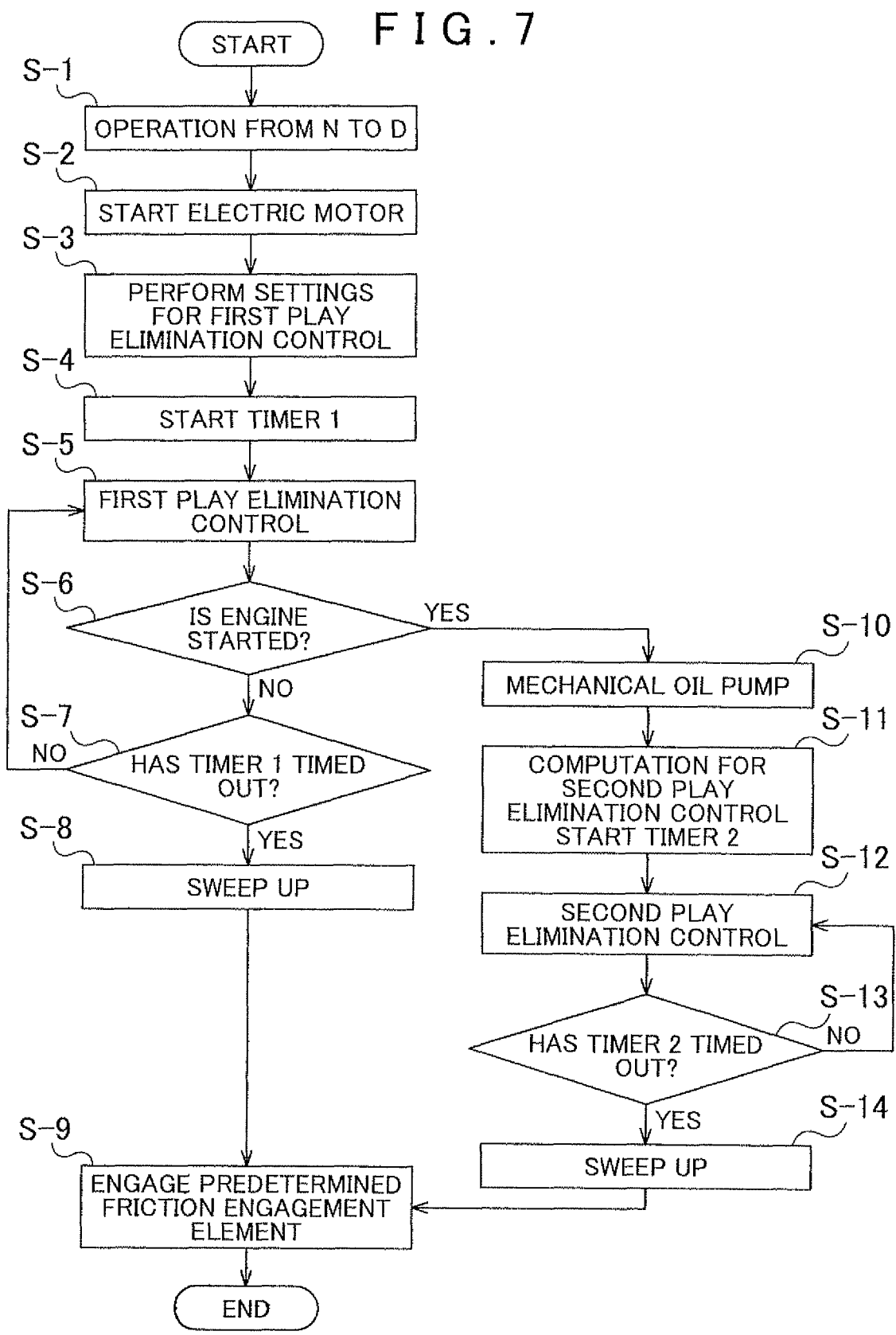
FIG. 7 is a flowchart showing engagement of the friction engagement element during start of the vehicle according to the present invention.

When switching is made to the engine travel mode, e.g. in the case where it is determined to be necessary to drive the internal combustion engine because the remaining battery capacity (SOC) falls short or the accelerator is depressed, during the first play elimination control (S-5) based on the discharge pressure of the electric oil pump 32, the internal combustion engine 2 is started by the starter 3A (or 3B) (S-6: YES). In FIG. 6, during the first play elimination control based on the minimum compensation pressure Pw of the electric oil pump 32 discussed above, the shift lever is switched from the N range to the D range (T1) to cause the control section (control device) 1 to output an engine start signal by switching an idle stop flag from 1 to 0 (T4). A predetermined delay is provided since the engine start command until the engine is actually started by the starter 3A (3B). After the predetermined delay, the internal combustion engine 2 is started to raise the engine speed (E). The mechanical oil pump 14 is also actuated (S-10) by rotation of the internal combustion engine 2 so that the oil pump 14 also generates a hydraulic pressure. When the rotational speed of the internal combustion engine 2 becomes equal to or more than a predetermined rotational speed such as 500 rpm (T5), switching is made to the hydraulic pressure based on the mechanical oil pump 14. Therefore, the command pressure is changed from the first play elimination pressure Pw determined in advance in accordance with the hydraulic pressure based on the electric oil pump 32 to the second play elimination pressure Pm which is a constant pressure determined in advance in accordance with the relatively low discharge pressure (discharge amount) of the mechanical oil pump 14 at a low engine speed such as an engine speed of 500 rpm. The second play elimination pressure Pm is higher than the first play elimination pressure Pw based on the electric oil pump 32. Thus, the check valve 55*b* in communication with the electric oil pump 32 is closed, and the check valve 55*a* in communication with the mechanical oil pump 14 is opened so that the discharge pressure from the mechanical oil pump 14 is supplied to the line pressure passage.

Then, the control device 1 computes a set time tx (timer 2) for the second play elimination control performed at the second play elimination pressure Pm (S-11). In the computation, defining the time (play elimination finish time: second set time) required for the clutch C-1 hydraulic servo to be charged to the stroke end by the second play elimination pressure Pm from the mechanical oil pump as t(Pm), defining the time (first set time) required for the clutch C-1 hydraulic servo to be charged to the stroke end by the first play elimination pressure Pw from the electric oil pump as t(Pw), and defining the elapsed time for which the hydraulic servo has already been charged by the first play elimination pressure Pw, during a period (T1 to T5) since generation of the first play elimination pressure Pw by the electric oil pump 32 is started before generation of the second play elimination pressure Pm by the mechanical oil pump 14 is started, as ts, the friction engagement element control unit sets the second set time tx as follows:

$$tx = t(Pm) \cdot [1 - ts/t(Pw)]$$

That is, the second set time tx is computed in accordance with the proportion (ts/t(Pw)) of the time for which the hydraulic servo has already been charged by the first play elimination pressure before the second play elimination control is started to the first set time t(Pw). The timer 2 is set to the computed value tx (S-11).

The second play elimination control is performed at the second play elimination pressure (Pm) generated by the mechanical oil pump 14 for the set time tx for the timer 2 (S-12). When the timer 2 times out, the second play elimination control is terminated (S-13: YES). This allows the piston of the hydraulic servo for the clutch C-1 to be moved to the stroke end to finish play elimination. After that, the hydraulic pressure discharged from the mechanical oil pump 14 is regulated to sweep up the C-1 pressure (S-14) to completely engage the clutch C-1 (S-9). Consequently, play elimination is finished through play elimination control which is performed for a predetermined time [t(s)+tx] at two constant pressures with switching from the first play elimination pressure Pw to the second play elimination pressure Pm, and thereafter the hydraulic pressure is swept up to start engagement of the clutch. Thus, the hydraulic pressure is not abruptly raised to cause an engagement shock while the piston of the hydraulic servo is moved. In the case where the engine is started during EV travel, the clutch C-1 can be engaged using the second play elimination pressure (Pm) faster than the first play elimination control which uses only the first play elimination pressure Pw. Therefore, substantially no sense of delay will be given.

In this state, the internal combustion engine 2 is started with the vehicle driven to travel by the rear motor 20, and power of the internal combustion engine 2 is transferred to the input shaft 12 of the automatic transmission 10 via the torque converter 4. With the clutch C-1 engaged in the speed change mechanism 5 of the automatic transmission 10, the one-way clutch F-1 is engaged with the drive force for the front wheels 80*fl*, 80*fr* exceeding the drive force for the rear wheels 80*rl*, 80*rr* by the rear motor 20 to establish the first speed, and the front wheels 80*fl*, 80*fr* are driven to drive the vehicle. The automatic transmission 10 performs shifting in accordance with the vehicle speed and the throttle opening to drive the vehicle at a cruising speed.

The above description is applied to a case where the engine is started in EV travel so that the vehicle travels using the internal combustion engine as a power source, and may be also applied to the engine travel mode in which the vehicle travels using only the engine with the disengagement clutch C-M disengaged and to the hybrid travel mode in which the rear wheels are driven by the rear motor 20 assistively or for regeneration with the clutch C-M remaining engaged and the internal combustion engine driving the front wheels. In the hybrid travel mode, the engine is stopped when the vehicle is stationary, and the vehicle is started by the rear (electric) motor. When the vehicle reaches a predetermined speed, the engine is started to drive the vehicle using power of the engine.

In the above description, the present invention is applied to a case where the vehicle travels at a low speed. However, the present invention may be applied not only to the first speed but also to a predetermined friction engagement element of the automatic transmission. The clutch C-2 may be subjected to the play elimination control for the fourth speed or higher, and the brake B-2 may be subjected to the play elimination control for the reverse speed. In the embodiment discussed above, when the shift range is switched from N to D, the predetermined friction engagement element (for example, clutch C-1) is engaged by a hydraulic pressure from the electric oil pump while the internal combustion engine is stopped. However, the present invention may be similarly applied to a case where the vehicle speed is transitioned from more than a predetermined vehicle speed to the predetermined vehicle speed or less. This is because it is also necessary to engage the predetermined friction engagement element using the hydraulic pressure from the electric oil pump in such a case. In addition, the present invention may be similarly applied to a case where a predetermined oil temperature range (for example, 0° C. to 100° C.) is set in advance as a condition for actuation of the electric oil pump and the oil temperature which has been outside the predetermined temperature range comes into the predetermined temperature range. This is because it is also necessary to engage the predetermined friction engagement element using the hydraulic pressure from the electric oil pump in such a case.

In the embodiment, the automatic transmission 10 is a multi-speed automatic transmission that establishes six forward speeds and a reverse speed. However, the present invention is not limited thereto, and may be applied to a multi-speed transmission that establishes seven or more or five or less forward speeds.

In the embodiment, the present invention is applied to a drive device for a four-wheel-drive hybrid vehicle in which either the front wheels or the rear wheels are driven by the electric motor and the other wheels are driven by power of the internal combustion engine via the automatic transmission. However, the electric motor may be in-wheel motors, or the present invention may also be applied to a drive device for a so-called one-motor hybrid vehicle in which power of the internal combustion engine is transferred to either the front wheels or the rear wheels via the automatic transmission and power of the electric motor is transferred to the same wheels.

The present invention is utilized for an automobile (hybrid vehicle) including an engine and a rotary electric machine (motor) each serving as a drive source.

What is claimed is:

1. A control device for a hybrid vehicle automatic transmission mounted on a hybrid vehicle that includes a rotary electric machine and an internal combustion engine each serving as a drive source and that allows power of the internal combustion engine to be transferred to wheels via an automatic transmission and allows wheels to be driven by the rotary electric machine with the internal combustion engine stopped, the automatic transmission including an electric oil pump and a mechanical oil pump driven by power of the internal combustion engine each serving as a hydraulic pressure source, in which a hydraulic pressure from the hydraulic pressure source is regulated by a pressure regulation valve to be supplied to a hydraulic servo for a predetermined friction engagement element of the automatic transmission, the control device for a hybrid vehicle automatic transmission comprising:

a friction engagement element control unit that controls the pressure regulation valve in engaging the predetermined friction engagement element so as to perform play elimination of the predetermined friction engagement element at a play elimination pressure, at which a piston for the predetermined friction engagement element is moved from an attachment position to a state immediately before the predetermined friction engagement element provides a torque capacity, and thereafter gradually increase the hydraulic pressure from the play elimination pressure, wherein:

the friction engagement element control unit includes a first play elimination control unit that sets a first play elimination pressure as the play elimination pressure for a first set time in the case where the predetermined friction engagement element is engaged using a hydraulic pressure from the electric oil pump in a travel state in which only the rotary electric machine serves as a drive source;

the first play elimination pressure is lower than a play elimination pressure for use in the case where the predetermined friction engagement element is engaged using a hydraulic pressure from the mechanical oil pump in a travel state in which the internal combustion engine serves as a drive source; and the first set time is longer than a set time for which the play elimination pressure is set in the case where the predetermined friction engagement element is engaged using a hydraulic pressure from the mechanical oil pump in a travel state in which the internal combustion engine serves as a drive source.

2. The control device for a hybrid vehicle automatic transmission according to claim 1, wherein the control device includes a second play elimination control unit that sets a second play elimination pressure higher than the first play elimination pressure for a second set time, the second play elimination control unit being configured to operate in place of the first play elimination control unit in the case where the internal combustion engine is started to serve as a drive source during operation of the first play elimination control unit.

3. The control device for a hybrid vehicle automatic transmission according to claim 2, wherein:

the first play elimination pressure and the second play elimination pressure are each a constant pressure set in advance; and the second play elimination control unit computes the second set time on the basis of a proportion of an elapsed time from start of control by the first play elimination control unit to switching to control by the second play elimination control unit to the first set time.

4. The control device for a hybrid vehicle automatic transmission according to claim 3, wherein the predetermined friction engagement element is a first friction engagement element that is engaged for the automatic transmission to establish a first forward speed.

5. The control device for a hybrid vehicle automatic transmission according to claim 4, wherein control by the second play elimination control unit is started when a rotational speed of the internal combustion engine becomes equal to or more than a predetermined rotational speed.

6. The control device for a hybrid vehicle automatic transmission according to claim 1, wherein:

power of the internal combustion engine is transferred to either front wheels or rear wheels via the automatic transmission; and power of the rotary electric machine is transferred to the other wheels.

\* \* \* \* \*